June 15, 1943.  K. G. COMPTON  2,321,997
ELECTROLYTIC CONDENSER
Filed March 25, 1941
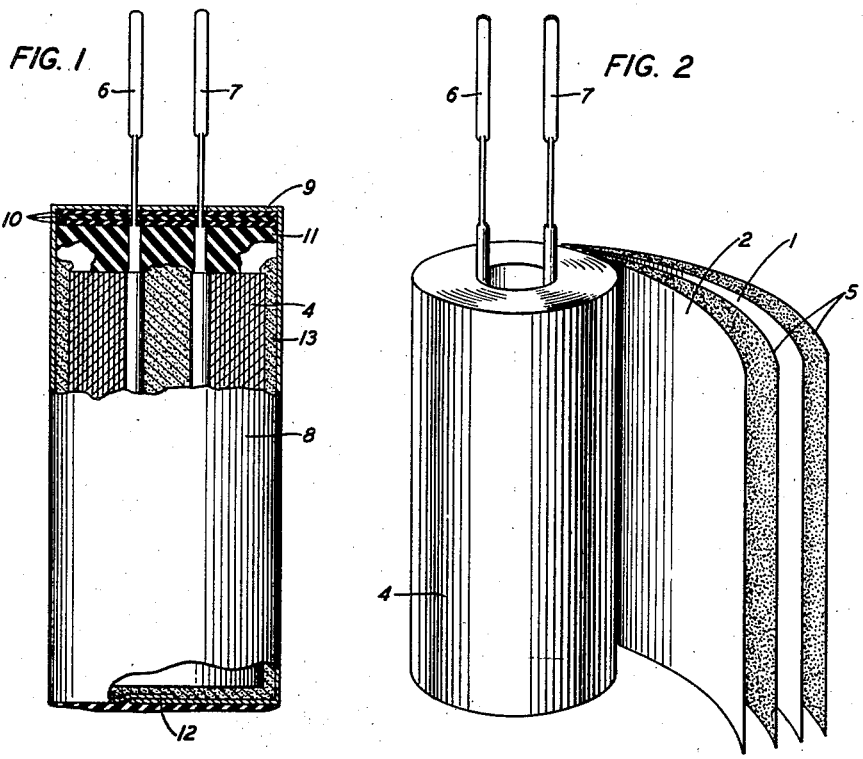
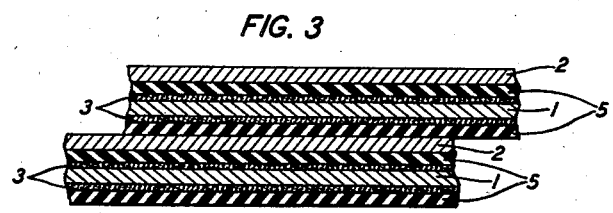
INVENTOR
K. G. COMPTON
BY
B. W. Jackson
ATTORNEY Patented June 15, 1943

2,321,997

UNITED STATES PATENT OFFICE 2,321,997

ELECTROLYTIC CONDENSER

Kenneth G. Compton, Madison, N. J., assignor to Bell Telephone Laboratories, Incorporated, New York, N. Y., a corporation of New York Application March 25, 1941, Serial No. 385,053

12 Claims. (Cl. 175—315)

This invention relates to electrolytic condensers of the type including a pair of spaced metallic armatures constituting the plates of the condenser, at least one of which armatures has a dielectric film thereon, and an electrolyte between said armatures. In such condensers, the dielectric film on at least one of the armatures, which is usually an oxide film, serves as the sole insulation between the armatures, the conductive electrolyte in effect eliminating the space between the armatures. Since the capacity of a condenser is inversely proportional to the thickness of the dielectric between the armatures, and the dielectric film in an electrolytic condenser is extremely thin, it is possible with electrolytic condensers to obtain capacities many times greater than those of other types of condensers having the same armature area but different dielectric, and thus to obtain very large capacities in a small space.

The electrolytic condensers may be broadly classified as the "wet" type and the "dry" type. In the "wet" type, a pair of spaced metallic armatures, at least one having thereon a dielectric film, usually an oxide film, is suspended in a suitable electrolyte which is a liquid of considerable mobility at room and the ordinary range of operating temperatures. The electrolyte and at least one armature are disposed in a sealed container to prevent leakage, said container being, if desired, one of the armatures.

In the "dry" type of electrolytic condenser, the electrolyte is of such nature or so carried that it does not flow readily if at all at room or operating temperatures and thus avoids one of the primary disadvantages of the "wet" type of condenser—that of leakage. The "dry" type of condenser, therefore, can be mounted in any position, whereas the range of positions in which the "wet" type can be mounted is usually limited by the necessity of avoiding leakage. To promote these advantages it is preferable in the "dry" type of condenser that the electrolyte itself be of such a nature that it does not flow appreciably if at all at room or the ordinary range of temperatures.

In the "dry" type of condenser, furthermore, the armatures are usually separated by a porous spacer, usually of textile or fabric, impregnated with the electrolyte. Usually such a condenser comprises two porous spacers and two metal foil armatures in interweaved relation, the whole being rolled into a cylinder or the like and inserted into a suitable liquid-tight case, the spacers being impregnated with the electrolyte.

The present invention relates more particularly to "dry" type electrolytic condensers.

The electrolyte in such a condenser comprises an ionized substance which provides the conductivity of the electrolyte. In general, it is desirable that the conductivity of the electrolyte be as high as possible in order that the internal resistance of the condenser be low. Solid crystalline electrolytes have been proposed for use in "dry" type condensers but are, in general, characterized by the disadvantage that, due to a lack of ionic mobility, their conductivity is low. Therefore, amorphous electrolytes are generally employed. To minimize the possibilities of leakage; to minimize the escape of the liquid electrolyte from between the armatures particularly if it is impregnated in a spacer between the armatures; to prevent settling of the liquid electrolyte, particularly if it is impregnated in a spacer; and to inhibit in the condenser movement of the liquid with respect to the armatures since such movement tends to deteriorate the delicate film on the armature, it is advantageous that the viscosity of the liquid electrolyte be so high that it does not tend to flow appreciably at room or operating temperatures.

The employment of a liquid electrolyte of such high viscosity, however, causes difficulties in the introduction of the electrolyte between the armatures. For example, it is difficult to obtain thorough impregnation of the porous spacers if the electrolyte is of high viscosity. With an electrolyte of high viscosity it is also extremely difficult to obtain thorough impregnation of the armatures when they are of a porous nature or have their surfaces etched to increase their effective surfaces and hence the capacity of the condenser, since it is difficult to obtain complete contact of the thick electrolyte with all the surfaces of the minute interstices in the armature. These difficulties are accentuated when it is desired to impregnate the condenser after the mechanical parts thereof have been assembled, which is often desirable to reduce manufacturing costs. Although in most cases electrolytic condensers of the "dry" type are impregnated with an electrolyte which has been heated to reduce its viscosity, in many cases the viscosity of the electrolyte is not sufficiently reduced by heat to permit easy and satisfactory impregnation.

The present invention overcomes these difficulties and makes possible ready and thorough impregnation of an electrolytic condenser even though an electrolyte of high viscosity is employed and even though impregnation is done after assembly of the mechanical parts of the condenser. This is accomplished by employing an electrolytic liquid which is of high viscosity at room or operating temperatures and which has incorporated therein a minor proportion of a substance which greatly reduces the viscosity of the electrolyte at elevated temperatures at which the electrolyte is impregnated but which does not reduce the viscosity or even increase the viscosity of the electrolyte at room or ordinary operating temperatures.

The present invention will be discussed in connection with the accompanying drawing in which:

Fig. 1 is a sectional elevation of one form of condenser embodying the present invention;

Fig. 2 is a perspective of the wound foil armatures and spacers of said condenser; and Fig. 3 is an elevation to an enlarged scale of a portion of the illustrated condenser showing the armatures and spacers.

According to the present invention an amorphous electrolyte suitable for the "dry" type of condenser, having a viscosity sufficiently high at room or ordinary operating temperatures to prevent a tendency to flow appreciably, if at all, but permitting sufficient ionic mobility of one or more ionized substances contained therein to have good conductivity, may include as a predominant constituent other than water one or more suitable water-soluble reaction products of a suitable polyhydric alcohol such as ethylene glycol, diethylene glycol, triethylene glycol, or one of the hexahydric alcohols, mannitol, sorbitol or dulcitol, with a suitable weak polybasic acid, such as boric acid, tartaric acid, citric acid or fumaric acid.

Such reaction products are prepared by heating the alcohol and the weak polybasic acid until reaction occurs. In some cases, polymerization may occur. The interaction should not be carried out until a solid is formed, but should be continued until a thick liquid of high viscosity at room temperature is attained. Such reaction product is advantageously mixed with a small quantity of an ionizable substance, such as one or more weak acids and/or salts of weak acids with water as a solvent, to increase the conductivity. Highly disassociated ions such as chloride, sulphate or nitrate ions should be avoided in condensers having an oxide dielectric film formed on one or more of the metal armatures since they are extremely detrimental to such film. For example, such highly disassociated ions are detrimental to oxide films formed on armatures of aluminum or magnesium which are usually employed.

Electrolytes or electrolytic condensers containing such reaction products may have their hydrogen ion content readily adjusted to a pH value in the vicinity of neutrality for the purpose of protecting the dielectric oxide films on the armatures. The oxide film on a condenser armature is ordinarily soluble in both acid and alkaline solutions, wherefore it is desirable that the pH value of the electrolyte be within the range of 5 to 8.5 in order to be within the range of maximum insolubility of the film and thus increase the life of the condenser. If the reaction product in water solution is originally acidic, as is usually the case, its pH value may be raised by the addition of a small amount of a suitable alkali, such as sodium hydroxide. An aqueous solution of a weak acid and, if desired, a salt of a weak acid, such as one of the weak acids indicated above may be added to advantage as a buffer mixture. The alkali, weak acid and salt of weak acid ionized in water in the electrolyte advantageously increase the conductivity of the electrolyte.

The viscosity of the electrolyte is governed to a certain extent by the initial viscosity of the reaction product and by the amount of water present in the electrolyte. To have the electrolyte of sufficient viscosity at room or ordinary operating temperatures to have the desired nonflowing properties, that is, of a viscosity on the order of 100 centipoises or more at 25° C. it should contain no more than about 35 per cent of water, and may contain as low as 5 per cent. Lower proportions of water in general provide higher viscosities. With viscosities on the order of or greater than that indicated, such an electrolyte can be impregnated only with difficulty even though its temperature is elevated to the neighborhood of 100° C. or more for the purposes of impregnation.

According to the invention, however, the electrolyte includes from 5 per cent to 30 per cent of one or more substances each of which is solid at room and ordinary operating temperatures, which has a melting point lying between about 60° C. and 100° C., which is soluble in water, and which is compatible with but not reactive with the reaction product of the weak polybasic acid and polyhydric alcohol forming the larger constituent of the electrolyte. Amides of from two to six carbon atoms possessing the above-indicated characteristics of melting points, solubility in water and low viscosity above the melting point, such as acetamide, lactamide and propionamide, are examples of substances which may be so employed. An electrolytic liquid of the above type having incorporated therein one or more of such substances has a viscosity at impregnation temperatures in the neighborhood of 100° C. very greatly less than that of an electrolyte in which such substance is not present. Indeed, at such temperatures its viscosity approaches that of light oil or kerosene, and may even be on the order of the viscosity of water. Consequently, electrolytic condensers can be very readily impregnated with such an electrolyte even after mechanical assembly. The electrolytic liquid embodying one or more of such substances, moreover, does not have its viscosity at room or ordinary operating temperatures decreased, but may have it increased, wherefore the above-indicated seemingly contradictory advantages of ease of impregnation and high viscosity at room or ordinary operating temperatures are provided.

In the condenser shown in the drawing, which illustrates one embodiment of the invention, each of the two armatures 1 and 2, constituting the plates of the condenser, comprises a sheet of aluminum foil of high purity. The foil 1 constituting one of the armatures has a dielectric film 3 of aluminum oxide formed on its surfaces. The two sheets of foil 1 and 2 are wound into a cylindrical coil 4 with sheets 5 of porous paper or the like therebetween acting as spacers to keep the foil separated and as a means for holding the electrolytic liquid which is impregnated in said spacers between the foils 1 and 2. Lead 6 is fastened in electrical contact with one of the foils and lead 7 is similarly connected to the other foil, both leads being disposed at the inner portion of coil 4. Each of the leads and the means connecting it to its respective foil is suitably insulated from the other foil and from the electrolyte, as by a coating of suitable insulating material.

The coil 4 is contained in an aluminum can 8. In the illustrated embodiment the leads 6 and 7 protrude through the integral end wall 9 of can 8, being insulated from each other and from the can by suitable rubber washers 10. Plastic sealing material 11, such as a suitable asphalt, is disposed in this end of the condenser between the end of coil 4 and the end 9 of can 8. The other end wall 12 of the can, is formed by the edge of the can which has been spun or bent over and coated with suitable plastic sealing material.

The spacers 5 are saturated or impregnated with the electrolyte 13 which also fills the space between the coil 4 and the can below the top of the coil. The electrolyte is a stiff liquid of the kind described above embodying the invention, and has a viscosity of at least 100 centipoises at 25° C. and flows very little, if at all, at room or ordinary operating temperatures.

Exceptional advantages are provided according to the present invention when the electrolyte comprises as a major constituent a reaction product of a hexahydric alcohol, such as mannitol, with a weak polybasic acid, such as boric acid together with a substance, such as acetamide, which greatly decreases the viscosity of the electrolyte at temperatures on the order of 100° C. without decreasing its viscosity at low temperatures. By employing such a reaction product in an electrolyte it is possible to obtain an electrolyte containing water in which conducting substances can be ionized and having both exceptionally high viscosity at room or ordinary operating temperatures and exceptionally good conductivity, qualities hitherto considered incompatible and practically impossible to obtain simultaneously. Apparently, the large number of hydroxyl groups of the alcohol on esterification cause polymerization or the formation of large complex molecules which in aqueous solution under proper conditions lend themselves to the formation of a gel which, however, permits good ionic mobility for conducting ions.

It is advantageous to employ mannitol as the hexahydric alcohol and boric acid as the weak polybasic acid to form the reaction product for the electrolyte, and the following discussion will describe the production of an electrolyte embodying a reaction product formed of these substances and providing exceptionally good results. To form the electrolyte, mannitol of high purity and having a low content of active ions such as chloride or sulphate ions is melted and boric acid or boric anhydride is added. The mixture is heated until it boils and held there until a constant boiling point is reached. The attainment of a constant boiling point indicates substantially complete esterification of the mannitol with the boric acid. The viscosity of the mannitol borate formed as a reaction product increases and the water produced during the reaction is driven off during the boiling.

The mannitol borate is dissolved in an equal amount of hot water. The solution has a pH of approximately 2, this pH and others determined during the course of the preparation of the electrolyte being advantageously determined by either the colorimetric or glass electrode method. By the addition of a suitable alkali such as sodium hydroxide, the pH of the solution is raised to about 8.5 or more. At a pH value below about 5, the mannitol borate will precipitate as the hot aqueous solution cools; at pH values above about 5, the precipitation does not occur. As the pH is progressively raised, the mannitol borate becomes more viscous until at a pH value of about 8, the aqueous solution of mannitol borate becomes a stiff gel due to peptization.

To minimize the harmful effect of the alkalinity in shortening the life of the condenser and increasing its leakage current, sufficient boric acid, or, preferably, boric acid and sodium borate, is added in the form of a solution to reduce the pH to a value between about 5 and about 8.5, preferably about 7. This addition of a buffer mixture aids the conductivity and tends to stabilize the pH, but does not appreciably reduce the viscosity of the mannitol borate. The final pH of the electrolyte must be determined after dilution until its water content is in the neighborhood of 50 per cent because the high viscosity of the electrolyte interferes with the pH measurement.

The water is then evaporated from the electrolyte to bring the water content down to between 5 per cent and 35 per cent. With the water content in this range, the electrolyte at room temperature is a very stiff, tough, jelly-like substance. Its final viscosity is at least about 100 centipoises at 25° C., the viscosity being determined to a certain extent by the amount of water present. While the electrolyte constitutes a solution of mannitol borate in water, it appears that due to the molecular size of the mannitol borate the solution has colloidal properties.

From about 5 per cent to about 30 per cent of acetamide is added to and thoroughly mixed with the electrolyte while it is maintained at a temperature of about 100° C. The amount of acetamide which is added varies with the water content of the electrolyte for best results. In an electrolyte having a water content of about 30 per cent, which is advantageous for most uses, from 15 to 20 per cent of acetamide provides exceptionally good results. When incorporated in an electrolyte to be used in connection with a condenser having aluminum armatures, the acetamide should be free of active ions such as sulphate, chloride or nitrate ions which will tend to corrode the aluminum.

In making the illustrated condenser, aluminum foil sheets are employed having a purity in the neighborhood of 99.993 per cent and a thickness from .001 to .003 inch. The foil on which it is desired to form a dielectric film is continuously passed through a forming apparatus of the conventional type at the required voltage, being immersed in a forming electrolyte composed of a mixture of boric acid and borax in a solution the pH of which is approximately 6.5. For condensers operating on voltages up to 100 the concentration is slightly less than that required for saturation. The forming operation is carried on at room temperature without stirring and with the foil strip passing through the bath at the rate of approximately one foot a minute. The foil is then washed with distilled water and dried. If desired, the foil may be subjected before the forming operation to an initial cleaning bath of chromic acid, after which it may be washed with distilled water before being passed to the forming bath.

A formed foil, an unformed foil and two spacers are placed in interleaved relation, with one of the spacers between the two foils. Each of the spacers is formed of at least one sheet of material which is preferably a sheet of absorbent tissue paper which has been treated with viscose, a sodium salt of cellulose xanthate, to improve its resistance to disintegration. It should be free of deleterious ions such as chloride or sulphate ions. The leads 6 and 7 are connected to their respective foils and insulated and the foils and spacers are then wound into a compact cylindrical roll, as is shown in Fig. 2 of the drawing, in such manner that the roll is made up of alternate foils and spacers. Several turns of the above-described paper may also be wound about the outside of the coil and cemented. The coil is then assembled as is described above in an aluminum can, the bottom of which is left open for impregnation purposes.

Impregnation is accomplished with the electrolytic liquid heated to about 100° C., the liquid being introduced into the bottom of the can to obtain ready, thorough impregnation. If desired, the condenser may be impregnated under pressure. The bottom of the can is then spun or bent over and sealed. The condenser may then be subjected to a forming voltage in the usual manner.

Because the electrolytic liquid in the above embodiment contains acetamide, at temperatures of impregnation on the order of 100° C. it is very liquid, having a low viscosity on the order of that of water, kerosene, or light oil, therefore it readily saturates the spacers and penetrates into the interstices of the armature and condenser unit during impregnation. On cooling, the electrolytic liquid becomes very stiff and jelly-like in nature and has little or no tendency to flow at room or ordinary operating temperatures. The acetamide not only does not render the electrolyte more liquid at room or ordinary operating temperatures but actually appears to increase its viscosity at such low temperatures.

It is apparent that various modifications may be made in the above-described illustrative condenser and that condensers embodying the invention other than that illustrated may be produced. For example, instead of mannitol, the other hexahydric alcohols such as sorbitol and dulcitol may be employed. Suitable reaction products of other polyhydric alcohols and other weak polybasic acids may also be employed, provided their employment makes possible the production of an electrolyte having high viscosity at operating temperatures with satisfactory conductivity. In some cases, where armatures of metals other than aluminum are employed, as when tantalum armatures are used, it is not so important to avoid the active ions such as chloride and sulphate ions. The present invention may also be applied in electrolytic condensers in which no spacers are employed.

It is intended that the patent shall cover by suitable expression in the appended claims whatever features of patentable novelty reside in the invention.

What is claimed is:

1. An electrolyte for electrolytic condensers having a liquid portion of a viscosity of at least about 100 centipoises at 25° C. and comprising essentially mannitol borate, from about 5 per cent to about 35 per cent of water, and from 5 per cent to about 30 per cent of acetamide, said electrolyte having a pH from about 5 to about 8.5 measured when its water content is about 50 per cent.

2. An electrolyte for electrolytic condensers having a liquid portion of a viscosity of at least about 100 centipoises at about 25° C. and comprising essentially mannitol borate, from 15 per cent to 20 per cent of acetamide, and about 30 per cent of water, said electrolyte having a pH of from about 5 to about 8.5 measured when its water content is about 50 per cent.

3. An electrolyte for an electrolytic condenser having a viscosity of at least about 100 centipoises at 25° C. and consisting of a mass comprising water and a reaction product of a polyhydric alcohol and a weak polybasic acid which mass at room or operating temperatures of the condenser has such a high viscosity as to have little or no tendency to flow and which at elevated temperatures has a viscosity sufficiently high to render impregnation difficult, and, in addition to said mass, at least one water soluble amide of from 2 to 6 carbon atoms having a melting point between about 60° C. and about 100° C. which greatly reduces the viscosity of said mass at temperatures at which impregnation of said electrolyte is performed but which does not substantially reduce the viscosity of said mass at room or operating temperatures of the condenser.

4. An electrolyte of the character described in claim 3 in which said amide is acetamide.

5. An electrolytic condenser comprising a pair of armatures having therebetween an electrolyte having a viscosity of at least about 100 centipoises at 25° C. and consisting of a mass comprising water and a reaction product of mannitol and a weak polybasic acid which mass at room or operating temperatures of the condenser has such a high viscosity as to have little or no tendency to flow and which at elevated temperatures has a viscosity sufficiently high to render impregnation difficult, and, in addition to said mass, at least one water soluble amide of from 2 to 6 carbon atoms having a melting point between about 60° C. and about 100° C. which greatly reduces the viscosity of said mass at temperatures at which impregnation of said electrolyte is performed but which does not substantially reduce the viscosity of said mass at room or operating temperatures of the condenser.

6. An electrolytic condenser comprising a pair of armatures having therebetween an electrolyte having a viscosity of at least about 100 centipoises at 25° C. and consisting of a mass comprising water and a reaction product of a hexahydric alcohol and a weak polybasic acid which mass at room or operating temperatures of the condenser has such a high viscosity as to have little or no tendency to flow and which at elevated temperatures has a viscosity sufficiently high to render impregnation difficult, and, in addition to said mass, at least one water soluble amide of from 2 to 6 carbon atoms having a melting point between about 60° C. and about 100° C. which greatly reduces the viscosity of said mass at temperatures at which impregnation of said electrolyte is performed but which does not substantially reduce the viscosity of said mass at room or operating temperatures of the condenser.

7. An electrolytic condenser of the character described in claim 6 in which said amide in said electrolyte is acetamide.

8. An electrolyte for electrolytic condensers having a viscosity of at least about 100 centipoises at about 25° C. and consisting of a mass comprising water and mannitol borate which mass at room or operating temperatures of the condenser has such a high viscosity as to have little or no tendency to flow and which at elevated temperatures has a viscosity sufficiently high to render impregnation of the condenser difficult, and, in addition to said mass, at least one water soluble amide of from 2 to 6 carbon atoms having a melting point between about 60° C. and about 100° C. which greatly reduces the viscosity of said mass at temperatures at which impregnation of said electrolyte is performed but which does not substantially reduce the viscosity of said mass at room or operating temperatures of the condenser.

9. An electrolyte of the character described in claim 8 in which said amide is acetamide.

10. The method of making an electrolyte for electrolytic condensers comprising incorporating in a mass comprising water and a reaction product of a hexahydric alcohol and a weak polybasic acid which mass in the absence of the hereinafter-named component at room or operating temperatures has such a high viscosity as to have little or no tendency to flow and at elevated temperatures has a viscosity sufficiently high to render impregnation difficult, at least one water soluble amide of from 2 to 6 carbon atoms having a melting point between about 60° C. and about 100° C. which greatly reduces the viscosity of said mass at elevated impregnating temperatures but which does not substantially reduce the viscosity of said mass at room or operating temperatures.

11. The method of making an electrolyte for electrolytic condensers comprising incorporating in a mass comprising water and a reaction product of a polyhydric alcohol and a weak polybasic acid which mass in the absence of the hereinafter-named component at room or operating temperatures has such a high viscosity as to have little or no tendency to flow and at elevated temperatures has a viscosity sufficiently high to render impregnation difficult, at least one water soluble amide of from 2 to 6 carbon atoms having a melting point between about 60° C. and about 100° C. which greatly reduces the viscosity of said mass at temperatures at which impregnation of said electrolyte is performed but which does not substantially reduce the viscosity of said mass at room or operating temperatures.

12. The process of claim 11 in which said amide is acetamide.

KENNETH G. COMPTON.